United States Patent [19]
Lampus

[11] 3,798,822
[45] Mar. 26, 1974

[54] LIGHTED FISHING FLOAT

[76] Inventor: Randy M. Lampus, 1501 Rio Hondo Rd., San Benito, Tex. 78550

[22] Filed: Sept. 22, 1971

[21] Appl. No.: 182,695

[52] U.S. Cl................................. 43/17.5, 43/42.36
[51] Int. Cl............................................ A01k 75/02
[58] Field of Search .......... 43/17.5, 17.6, 17, 42.36, 43/43.1

[56] References Cited
UNITED STATES PATENTS

| | | | |
|---|---|---|---|
| 2,559,084 | 7/1951 | McGlade | 43/17.5 |
| 2,776,518 | 1/1957 | Felmlee | 43/42.36 X |
| 3,401,483 | 9/1968 | Bellah et al. | 43/43.1 X |
| 2,236,215 | 3/1941 | Klinitski | 43/17.5 |
| 3,091,882 | 6/1963 | Dudley | 43/17.5 |
| 2,458,611 | 1/1949 | Long | 43/17.5 |

OTHER PUBLICATIONS

The Sporting Goods "Dealer", Volume 130, No. 6, 9–1964, p. 145, Lure Lite.
Popular Mechanics, 2–1954, p. 211, Doolittle.
Markus, Electronics and Nucleonics Dictionary, 3rd ed., 1966, p. 425, "Neon Oscillator".

*Primary Examiner*—Louis G. Mancene
*Assistant Examiner*—James H. Czerwonky

[57] ABSTRACT

A lighted fishing float having an alternating current-excitable neon lamp for illuminating the float and a battery power source. An oscillator powered by the battery provides alternating current to illuminate the lamp.

4 Claims, 2 Drawing Figures

PATENTED MAR 26 1974  3,798,822
FIG.1
FIG.2
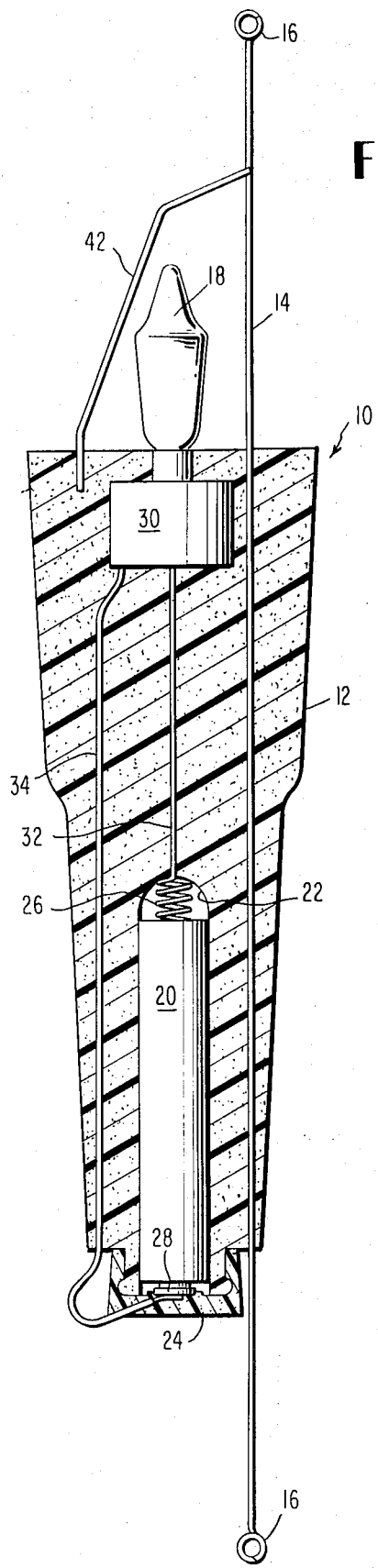
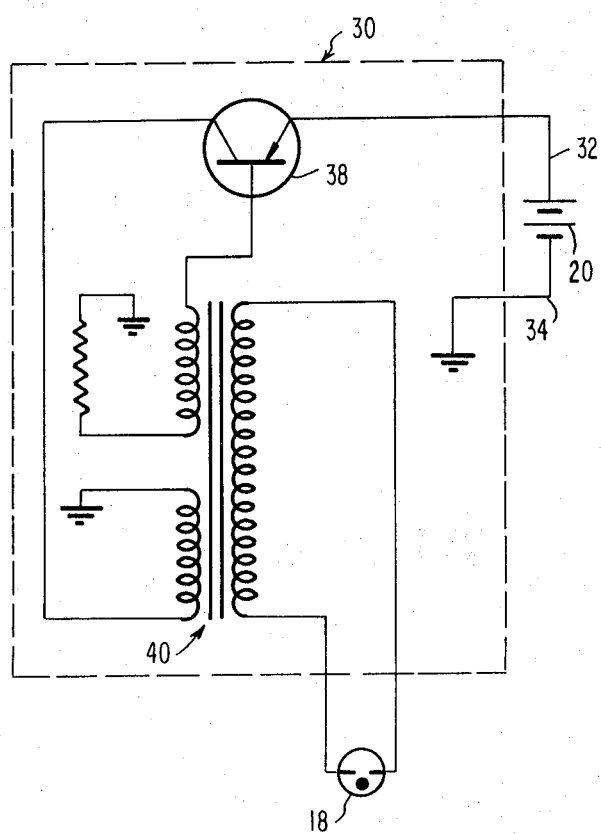

LIGHTED FISHING FLOAT

BACKGROUND OF THE INVENTION

In the art of fishing, the fishing line is often supported by a float disposed intermediate the ends of the line. The float serves to support the line at a point other than the boat, bank or other point at which the fisherman is actually located. The float also serves as an indicator to signal a strike on the line.

It is quite generally desirable to fish at dusk, nighttime or before sunrise depending on the feeding habits of the fish. In such cases, the conventional float cannot be readily seen without the aid of a light plant or other means of indirect lighting. Means have been provided in the prior art for furnishing self illuminated fishing floats, however, these have required complicated and expensive external power sources or internal power sources of either such great size and weight or of such short duration as to render them impractical to the average fisherman.

The invention accomplishes its objectives by providing a float having an alternating current excitable gas filled lamp; a battery power source and an oscillator driven by said battery to provide alternating current to illuminate said lamp.

The invention also provides an illuminated fishing float wherein the stresses imparted through the fishing line bypass the float by furnishing a continuous leader disposed through the float to bypass the components thereof.

These and other objects and attendant advantages of this invention will become better understood to those skilled in the art by reference to the following detailed description when viewed in light of the accompanying drawings wherein like numerals throughout the figures thereof indicate like components and wherein:

BRIEF DESCRIPTION OF THE DRAWING

FIG. 1 is an elevational view, in section, of a float incorporating the teachings of the invention; and FIG. 2 is a wiring diagram of the electrical circuit of the float of FIG. 1.

DESCRIPTION OF A PREFERRED EMBODIMENT

With reference to FIG. 1, the float, shown generally at 10, comprises a body 12 having a wire leader 14 extending therethrough. The body is preferably formed such as by molding from a plastic material less dense than water such that the float 10, when fully assembled, will be floatable in water. Polyurethane foam is one material ideally suited for this purpose. The body 12 could, of course, be fabricated of material of greater density than water with sufficient voids therein to provide the required buoyancy if so desired or such voids could be formed in conjunction with a less dense material as design may dictate. The leader 14 is preferably molded in the body 12 and is provided with eyelets 16 at each end to furnish connection means to the rod and hook segments of the fishing line. By this disposition, forces generated in the fishing line are transmitted solely by the leader, bypassing the body 12 and the other components of the float 10.

A gas filled lamp 18 is disposed in the upper end of the body 12 to provide illumination for the float 10. The lamp 18 is of the type filled with a gas which is excited by the passage of alternating current such that the gas glows by such excitation to provide illumination of the lamp. Such lamps are well known in the art, the gas generally being neon, argon or the like. The important feature of such a lamp, as opposed to incandescent lamps or the like, is that the power required thereby is almost fully utilized in the production of light and there is very little lost through the production of heat thereby providing illumination efficiently with a minimum power requirement.

A dry cell battery 20 is disposed within a chamber 22 formed in the end of the body 12 opposite that of the lamp 18. With such disposition, the battery can act as ballast to maintain proper orientation of the float 10 so that the lamp 18 is positioned above the surface of the water when the float is in use. A cap 24, preferably of the snap-fit type, is disposed over the open end of the chamber 22 to provide a water tight enclosure for the battery 20. A spring-contact 26 is disposed in the upper end of the chamber 22 to make positive contact with one pole of the battery 20 when it is fully in place in the chamber 22 and a contact 28, concentrically disposed on the inner side of the cap 24, provides contact for the other pole of the battery.

In that the battery 20 provides direct current and the lamp 18 requires alternating current for operation, an oscillator 30 is disposed in the body 12 between the lamp 18 and the battery 20, connected thereto by conductors 32 and 34 from the contacts 26 and 28 respectively. The conductors are preferably molded in the body 12, the conductor 34 being provided with a loop at the lower end thereof to allow removal of the cap 24 for replacement of the battery 20 and simultaneously to provide a means to retain the cap after removal to prevent loss thereof. The oscillator 30 is emplaced within the body 12 preferably by molding into the upper end of the body.

Referring more particularly to FIG. 2, the oscillator 30 is shown in schematic and comprises a transistor 38 connected to the primary windings of a transformer 40. The transistor may be of any low power audio or RF type. One of the primary windings is connected to ground through a resistor while the other is connected directly to ground. The input leg of the transistor 38 connects to the battery 20 through the conductor 32 and the lamp 18, a NE-2 neon lamp for purposes of illustration, is connected to the secondary winding of the transformer 40. With the component values shown and a 1.5 volt dry cell battery, the oscillator produces approximately 90 volts A.C. at a current of 75 ma and a frequency of about 1 KHz. It has been found that a size Triple A carbon-zinc battery has a life expectancy of up to 6 hours continuous use while the life of a similar alkaline battery is 10 hours in this system. An oscillator made in accordance with this invention can be very small in size, the primary windings of the transformer constituting single layers and the secondary windings filling up the remainder of the core space. The completed oscillator can be coated with fiber glass resin or epoxy and then embedded in the body 12 as described above.

In use, the lamp of the device, energized when the cap 24 is emplaced with the battery 18 inserted, can be seen clearly for a distance of 75 yards or more and thereby provides an indicator of the position and condition of the fishing line under low light or dark conditions. A leader guide 42, projecting from the top of the body 12 to intersect the leader 14, serves to protect the lamp 18 from damage and prevents the fishing line from tangling with the top of the float 10 while casting.

The invention thereby provides a device which is reliable, inexpensive and easy to use. The float can readily be made light enough for use with either light or heavy tackle and may be used for fishing in any kind of water from lake to river or surf.

What has been set forth above is intended to be exemplary of a teaching in accordance with the invention to enable those skilled in the art in the practice thereof. It should be understood that the invention may be practiced other than as specifically described herein.

What is new and desired to be protected by Letters Patent of the United States is:

1. Lighted fishing float structure, comprising
a floatable body,
alternating-current-excitable, gas-filled lamp means carried by the body for illuminating the float,
electrical battery means carried by the body,
electrical circuit means connecting the lamp means and the battery means for conducting electrical current from the battery means to the lamp means, the electrical circuit means including oscillator means which is driven by the battery means for providing alternating current to the lamp means,
the body having a chamber for receiving the battery means,
the structure including removable cap means for closing the chamber,
the cap means including contact means for making electrical contact with the battery means,
the electrical circuit means including an electrical conductor which is secured to the body and which is electrically connected to the contact means and which is secured to the cap means to retain the cap means upon removal of the cap means from a position closing the chamber.

2. Lighted fishing float structure as defined in claim 1, including
an integral leader extending through the body and having opposite end portions,
means at each end portion of the leader for providing connection to adjacent segments of a fishing line, and
leader guide means projecting from the body and intersecting the leader for protecting the lamp means and for preventing the fishing line from tangling with the float.

3. Lighted fishing float structure as defined in claim 1, wherein the lamp means projects from one end portion of the body and the battery means is proximate to an extremity of the body which is opposite the lamp means.

4. Lighted fishing float structure as defined in claim 1, wherein the gas filling the lamp means comprises neon.

* * * * *